Sept. 15, 1964 C. S. FOLTZ 3,148,811
WEARABLE BAIT AND TACKLE CARRIER
Filed Aug. 7, 1961 2 Sheets-Sheet 1
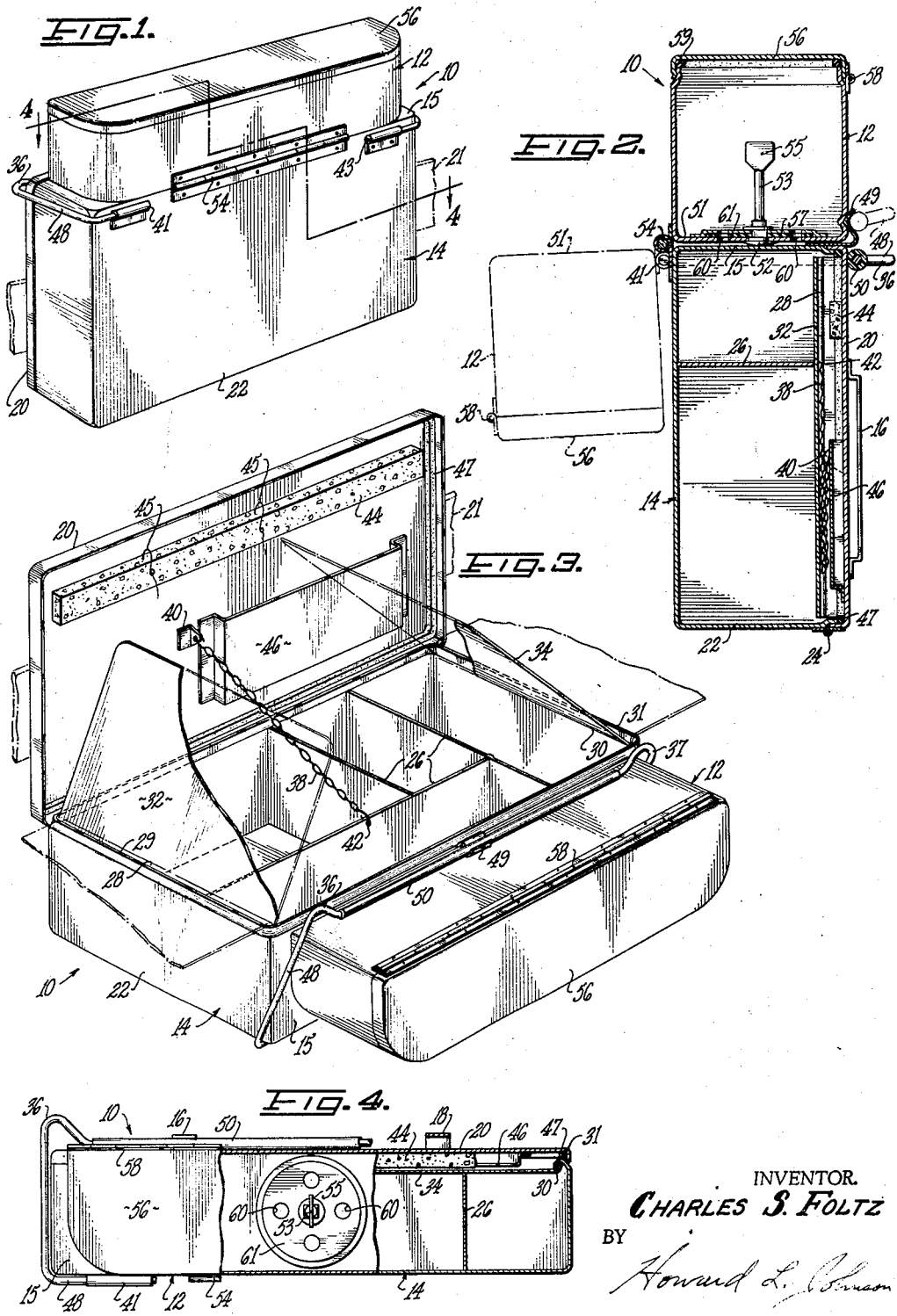
INVENTOR.
CHARLES S. FOLTZ
BY
Howard L. Johnson Sept. 15, 1964 C. S. FOLTZ 3,148,811
WEARABLE BAIT AND TACKLE CARRIER
Filed Aug. 7, 1961 2 Sheets-Sheet 2
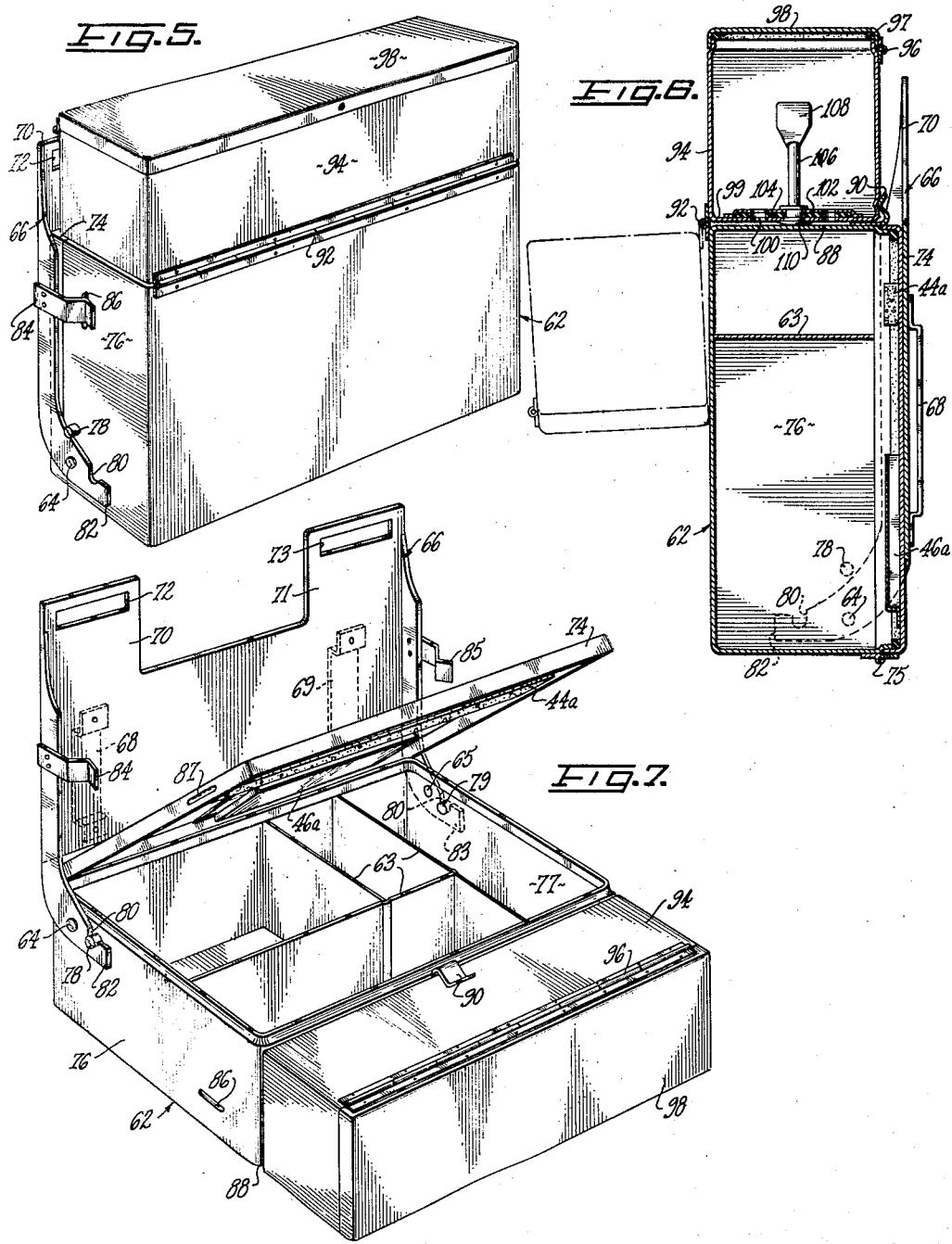
INVENTOR.
CHARLES S. FOLTZ
BY

3,148,811
WEARABLE BAIT AND TACKLE CARRIER
Charles S. Foltz, P.O. Box 247, Laytonville, Calif.
Filed Aug. 7, 1961, Ser. No. 129,632
5 Claims. (Cl. 224—5)

This invention relates to compact, handable (compartmented) container assemblies especially adapted to be worn outdoors by a fisherman or camper at his waist as by attachment to the user's (particularly a man's) belt or alternately hung by shoulder straps (especially in the case of a woman), which composite assembly includes an outfolding pair of connected containers arranged to provide easy access to the interior of either or both while still attached to the wearer, and additionally furnishing a horizontally disposable work surface (for manipulation of articles withdrawn or to be inserted in the container). Such surface is provided at waist level by the primary container being downswung 90° from the connected attachment band or belt of the wearer.

Such assemblies may be particularly exemplified by their use as bait and tackle carriers for sportsmen, being especially advantageous in providing the wearer with an always accessible collection both of small articles of necessary piscatorial gear, and of a work surface for attaching and detaching the same from a fishing line, while also enabling the wearer to open and close the latched assembly without digital manipulation when necessary, merely by pressure from the edge of his fist or arm against an edge or corner thereof when his hands are otherwise engaged. At the same time, the assembly being carried on a belt, the user's hands are free during both walking and standing; in addition, the assembly can be slid lengthwise along the belt to adjust it to the most comfortable position for carrying at the front or side of the waist.

Thus it often occurs that a fisherman may wish to replace or adjust a hook, leader, sinker, fly, bait or other article on his line while standing in water, or otherwise, when no available work surface is at hand. The problem still remains largely unresolved by his merely going ashore since it is quite unsatisfactory to lean over or sit down and spread out gear on a sandy or rocky beach, and indeed even this much ground-level clearing often may not be available nearby. In addition, between holding a fishing pole and trying to manipulate the various elements for the free end thereof, both hands are more than sufficiently occupied. Accordingly, the present invention provides in such event, both an immediately present and quickly adjustable work surface at waist level and a multi-unit container for storage and ready accessibility of needed bait and equipment.

When used as a bait and tackle carrier, my assembly includes a separate bait box hingedly secured to the principal container in such way as to provide easy access to the bottom level thereof so that when worms are carried in it (which normally congregate along the bottom), by a transitory inversion of 180° of the hinged box they can be readily removed from the surface layer thus presented. In contrast to some prior bait boxes, my construction does not require more than one closure, or demand that the worms migrate from one side or level of the container to the other. Alternately, the bait box can be employed to carry roe or other semi-fluid material, in which case the box is selectively sealed against leakage and entrance of air; but the construction also provides for circulation of air therethru, when desired, as when carrying worms.

A supplemental advantage arises from the fact that since the entire assembly is tightly sealed (when closed), it furnishes a certain buoyancy to the wearer (especially when comparatively empty) if he falls into water, and being securely attached to his clothing when being worn, it is not carried away by the current but assists in keeping him afloat.

Other objects and advantages will become apparent as the description proceeds, having particular reference to the accompanying drawings illustrating two presently preferred embodiments of the invention particularly usable as bait and tackle carriers wherein FIGURE 1 is a perspective view of one form of my bait and tackle carrier shown upright as it would be carried by attachment to a wearer's belt which extends horizontally across the rear face;

FIGURE 2 is a vertical transverse sectional view thru the carrier, with the unlatched position of the bail and the subsequent inverted position of the bait box indicated in phantom;

FIGURE 3 is a perspective view of the carrier of FIGURE 1 with the principal container opened to its horizontal position and its end trays raised partway and partially broken away to show structure behind, with their completely open positions indicated in phantom, FIGURE 4 is a top view of the closed carrier with the right two-thirds sectioned at two different vertical levels as indicated by the line 4—4 of FIGURE 1;

FIGURE 5 is a perspective view of a modified form of carrier wherein the assembly is suspended from a hanger worn by the user;

FIGURE 6 is a vertical sectional view of the modified carrier similar to that of FIGURE 2; and FIGURE 7 is a perspective view of the carrier of FIGURE 5 with the principal container in horizontal position and its cover partially open.

Referring particularly to FIGURES 1-4, the compact wearable or garment-attachable assembly 10 is constructed of two vertically stacked, hingedly connected containers 12, 14, of which the principal or lower one is provided with a pair of laterally separated, upright extending straps or belt-receiving loops 16, 18, spaced apart along the rear surface of closure 20 and disposed mutually parallel so as to receive a trouser belt or similar horizontal strap 21 inserted jointly therethru. By use of such a coupled belt or strap, a woodsman or fisherman may thus have the assembly in carrying and immediately usable position at his waist, desirably in front of him where it is easily reached by both hands, or alternately pushed to one side or the other along the belt so as to support the container on his hip or even behind him while standing or walking.

Essentially the principal unit 14 is a rectangular chamber (formed of metal, wood, plastic, or other sufficiently rigid structural material) of which the outer body shell 22 is pivotally attached along a lower, horizontal hinge line 24 to a permanently vertically disposed backing plate or closure 20 which is accordingly held upright by the belt-supported loops 16, 18. Internally, the body frame 22 is provided with a series of cross partitions 26, conveniently disposed at right angles, which divide it into several open-top compartments of any convenient size or configuration adapted to particular articles to be stored therein. Access to all the compartments is thus available when the body 22 is horizontally supported, that is, downswung from the belt-attached, vertical closure 20. Movement of the lower hinge 24 is limited to approximately 90° or a quarter circle, as by an internal chain 38 or analogous linkage or limit means between the container and closure. Accordingly the closure plate 20 being held against the wearer's body, the opened container 22 is thereby disposed outwardly projecting horizontally from the wearer so as in essence to provide a shelf or work surface for the user at waist level. By positioning of the assembly along the belt—as by location adjacent the navel—such work area is easily accessible to both hands.

Mounted along the upper side edges of the outswung container, by mutually parallel hinges 28, 30, are a pair of flat trays or panels 32, 34, foldable toward and away from each other. When infolded, their undersurfaces rest upon the upper edges of the partitions 26, edge-separated for a short distance which permits angular location therebetween of the suspension chain 38. The latter extends from an attachment bracket 40 on the underface of the closure plate 20 to a terminal coupling along an upper partition edge at 42. When outspread (each by 180° movement) the hinged trays 33, 34 are again positioned horizontally (FIG. 3) and due to their hinge mounts being inset from the container edges, the panels are supported upon the respective adjacent side edge 29, 31 of the container side walls in a generally level or horizontal position to again provide a supporting surface.

It will be evident that various articles of hunting and camping gear (or other material) can be segregated and stored in the several compartments defined by the partitions 26; and in association therewith, either or both of the trays 32, 34, when in horizontal position, provide a work surface for assembly and disassembly, for example, of tackle and the like, in conjunction with a fishing line and accessory equipment. At the same time there is provided along the inner face of the closure 20, a readily available, elongated strip of cork 44 or the like, into which hooks 45 may be thrust; and at a lower level along the inside of the cover, a parallel, outward spaced bracket 46 forms a slot or pocket behind which leaders (not shown) may be inserted. An inner gasket 47 ensures a water-tight and air-tight seal for the closed container.

With its respective ends journalled in bearing tubes 41, 43, which are secured along the upper margin of the lower unit 14, there is an (incompletely) rectangular shaped bail 48, generally conforming to the outline of the container but having forward corner projections 36, 37 for ease of manipulation by the wearer. The bail is capable of only limited angular movement (FIG. 2) oscillating between a raised or unlocked position wherein it is held by a resilient catch 49, and a lowered or horizontal position wherein the bail embraces the outer periphery of the lower container 14 so as to lock or tightly press together the vertical closure plate 20 and the upswung body shell 22. For rolling frictional engagement with the posterior face of the closure 20, there is an elongated, medially mounted, elastomeric cylinder 50 rotatably mounted on the bail. When the bail or roller 50 is upswung from the rear face of the upright closure 20 (to the unlocked position), it is yieldingly retained by engagement with the outer surface of resilient tongue 49. The opposite surface of the clasp 49 serves independently to hold the upper container 12 against the top wall 15 of the principal unit 14, as when carrying "wet bait."

The upper bait-carrying unit 12, conveniently similarly rectangular in outline, or of somewhat smaller perimeter, is pivotally connected along an outer hinge line 54 to the lower body 22. In carrying position, the floor 51 of the bait box is disposed parallel to and spaced a small distance above the top surface 15 of the container body 22 by abutment with a dependent projecting, head flange 52 of a central, upstanding stud 53 mounted within the bait box and provided with a flat sided, vertical extremity 55 for manual manipulation. The upper, horizontal wall of the bait box is formed by a top closure 56 mounted along a posterior hinge line at 58 (i.e. adjacent the wearer) and provided with an inner, peripheral gasket 59 so as to be tightly sealed when pressed shut. However, air may be selectively admitted thru a circle of apertures 60 in the bottom wall 51 by rotary alignment therewith of a correspondingly apertured disk 61 carried by the stud 53. A similarly apertured sealing or insulating disk 57 is disposed between the floor 51 and the movable disk 61, being rotatable jointly with the stud 53.

As is known to fishermen, worms placed in a container of loose earth or the like generally migrate to the bottom. Accordingly they can be placed in the top of the bait box 12, which is then soon inverted for carrying, thus resulting in their staying at the original level. Whenever it is desired to take out any, the container is turned up 180° to its "loading" position so that the required worms can be readily removed from the open "bottom" and then the container is returned to its inverted carrying position to encourage their continued congregation at the initial level. Alternately, any other kind of bait or material can be easily loaded (or removed) thru the top of the uninverted container 12 merely by opening the lid 56; and in addition the entire contents may be emptied by the lower container 22 being first outswung 90° (from its closed carrying position against the wearer's belt), and then the bait box being itself dropped 90° about the hinge 54. A complete inversion of 180° of the bait box can thus be effected either directly by itself, or in conjunction with the opened container 22; in each case the lid 56 can then be released for emptying the contents and/or insertion of a water hose for flushing out the interior.

The modification particularly illustrated in FIGURES 5–7 again comprises a generally rectangular, comparatively shallow, lower container 62 pivotally mounted along a bottom hinge line as by an opposing pair of trunnions 64, 65, so as to be disposed in front of a generally flat attachment or suspension hanger 66 which is adapted to be hung upright against the user's waist. Instead of being directly attached to the closure plate 20 as in the prior embodiment, a pair of rear belt loops 68, 69 are located on the posterior face of the hanger 66; also a pair of laterally separated, vertically upward extending, hanger tabs 70, 71 are cross-apertured adjacent their tops at 72, 73, for insertion therethru of a pair of shoulder straps (not shown) for suspending the assembly from the wearer's neck or shoulders (alternate or in addition to use of a belt strap thru the loops 68, 69). The container body 62 is also provided with a closure 74 disposed between the body and the forward face of the hanger so as to articulate with the container body along its horizontal, lower, rear margin at 75. In contrast to the prior form, the closure is not held vertically stationary but can be swung arcuately forward 90° either together with or subsequent to similar movement of the container body.

When the container 62 and closure 74 are both in downswung position, projecting horizontally outward in front of the wearer, the top of the closed cover 74 thus serves as a waist-level tray or work surface for the user in place of the prior lateral leaves 32, 34, and upon rotating it upward, access is had to the compartments defined by the several partitions 63. To each end wall 76, 77 of the container there is fixed an outwardly projecting stop pin or detent 78, 79 which longitudinally aligned pins are receivable in corresponding terminal notches 80 of the respective, forward-extending suspension arms 82, 83 of the hanger 66, so as to firmly support the container 62 in an approximately horizontal position when downswung. Alternately, in its upswung position, each end wall 76, 77 of the container is yieldingly retained between an opposing pair of forward-extending, resilient clasp members 84, 85, which respectively engage an outward projecting, detent rib 86. By similar detent ribs 87, the open cover 74 can be separately held upright between the resilient arms 84 when the container body 62 is disposed horizontally. As before, the underface of the cover 74 is provided with a cork strip 44–a for insertion of hooks, and an outward spaced pocket 46–a in which to store leaders.

Along the relatively narrow, horizontal top wall 88 of the principal container unit 62 (which wall becomes vertically disposed upon the container being downswung 90°) there is mounted adjacent the inner or posterior edge an upward projecting, resilient clasp 90, and along the opposite edge is a hinge assembly 92 which latter pivotally attaches the bait box 94 to the larger unit 62. As in the prior construction, the bait box is thus adapted to be rotated a half turn from atop the vertically disposed, principal container 62 so as to be completely inverted 180° to permit carrying the worms on the "bottom" of the container, from whence they are readily inserted and removed (when the bait box is upswung) by means of a top closure 98 pivotally mounted along the hinge line 96 as in the prior construction. A rectangular gasket or sealing ring 97 is secured about the inner periphery of the closure 98 for snug engagement with the edges of the bait box sides when closed thereagainst.

Provision is also made for selectively sealing or aerating the bait chamber 94 as in the prior construction. The bottom wall 99 of the bait box 94 is formed with an annular series of transverse apertures 100 having closed spaces therebetween, and is internally overlaid by a rotatable, transversely apertured disk 102 of similar configuration so that passage of air through the two annular series of openings is permitted or prevented by their mutual alignment or non-alignment. A similarly apertured sealing disk 104 (as of cork or elastomeric material) is disposed between the two walls 99, 102, all three of which are traversed by a central stud 106 having an inner terminal, grasping surface 108 and an outer abutment flange or head 110 disposed to register with the top wall 88 of the principal container when the bait box is "upturned" (FIGS. 5-6) in juxtaposition therewith.

I claim:

1. A multiple-unit handable assembly for holding bait and tackle and the like, which is adapted to be detachably supported on a person at approximate waist level, comprising:
   (a) a principal container having integral top, bottom, side, and front walls;
   (b) a closure for said container which is pivotally connected adjacent the rear horizontal edge of said bottom wall of the container, and has its posterior face disposed in an upright position adjacent the wearer's waist, so that said container can be opened by being downswung about the said pivotal connection approximately 90° so that it is disengaged from the said upright closure and disposed in a horizontally outward projecting position, whereby the interior of the container is accessible to the wearer through the rear side thereof which was formerly covered by said closure;
   (c) stop means for selectively holding the downswung open-topped container at said horizontally projecting position so that the container interior is accessible to the wearer;
   (d) fastening means for selectively holding the container and the closure together in an upright position;
   (e) an enclosed bait box which rests on the top wall of said container and has a bottom wall in juxtaposition with the said top wall of the container;
   (f) said bait box having a top wall which is a closure therefor and is disposed at the top thereof when the bait box is in upswung position;
   (g) the forward lower edge of said bait box being pivotally connected to said container about the upper edge of said front wall of said container so that said bait box can be inverted; and
   (h) releasable locking means holding said bait box in position on said container with its bottom wall juxtaposed to the said top wall of the container.

2. A multiple unit handable assembly for holding bait and tackle and the like as set forth in claim 1, wherein the container when downswung has at least one flat panel member pivotally connected to one of said walls of the container to provide a work surface.

3. A multiple unit handable assembly for holding bait and tackle and the like, as set forth in claim 1 wherein said fastening means comprises a bail pivotally secured at each end to said container body adjacent the upper edge of the said front wall and firmly engages the posterior face of said upright closure when it is in fastening position so that said closure and said container are held together in closed upright position, said bail being capable of being upswung a small arcuate distance to an unlocked position.

4. A multiple unit handable assembly for holding bait and tackle and the like, as set forth in claim 1, wherein the bottom wall of the bait box has a ventilation and sealing means adjacent thereto, so that it is disposed at the top of the bait box when it is in outwardly swung carrying position.

5. A multiple unit handable assembly for holding bait and tackle and the like, as set forth in claim 1 wherein the container has a permanently upright hanger means which is disposed adjacent the wearer's waist, which is pivotally connected to said container adjacent the rear bottom edge thereof, so that it overlies the posterior face of said closure and the closure can be downswung with the container to provide a horizontal work surface.

References Cited in the file of this patent

UNITED STATES PATENTS

| | | |
|---|---|---|
| 318,132 | Peek | May 19, 1885 |
| 1,267,564 | Livingston | May 28, 1918 |
| 1,328,001 | Kinsman | Jan. 13, 1920 |
| 1,549,400 | Wimler | Aug. 11, 1925 |
| 1,736,337 | Borel | Nov. 19, 1929 |
| 1,815,101 | Goldstein | July 21, 1931 |
| 2,677,486 | Schermerhorn | May 7, 1954 |
| 2,936,066 | Meksula | May 10, 1960 |
| 2,974,437 | Stadler | Mar. 14, 1961 |

FOREIGN PATENTS

| | | |
|---|---|---|
| 896,322 | France | Apr. 24, 1944 |